July 20, 1954
C. K. WOLLAM
2,684,221
INSTRUMENT MOUNTING
Filed June 12, 1952
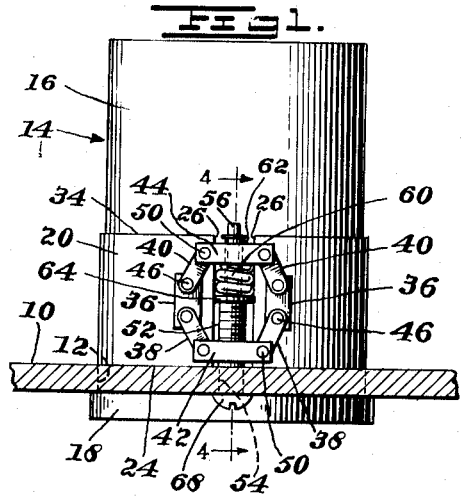
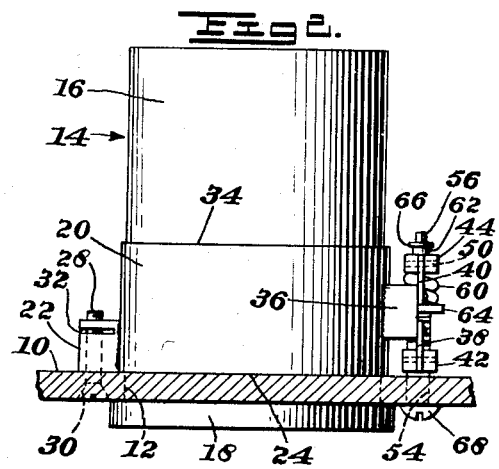
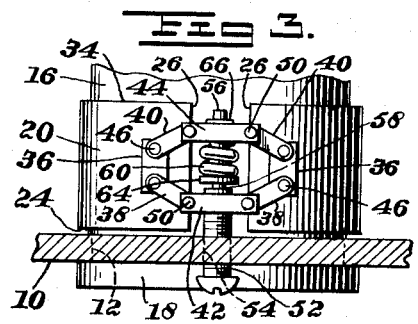
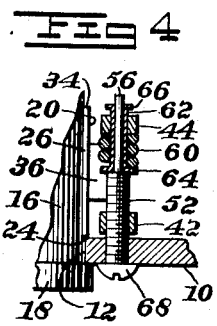
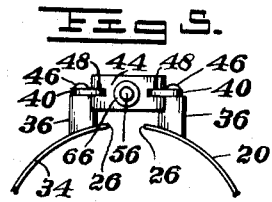
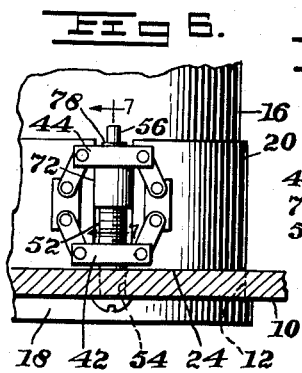
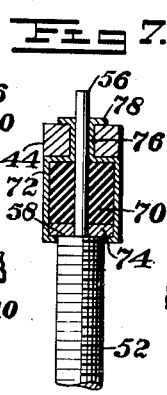
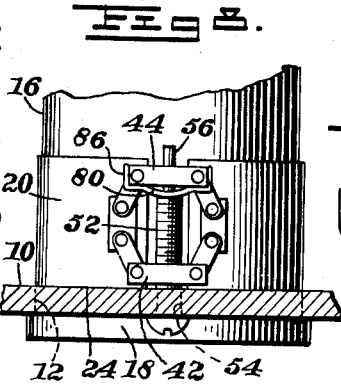
INVENTOR:
Carl K. Wollam,
BY Cushman, Darby & Cushman
ATTORNEYS.

Patented July 20, 1954

2,684,221

UNITED STATES PATENT OFFICE 2,684,221

INSTRUMENT MOUNTING

Carl K. Wollam, Celina, Ohio, assignor to Wollam Aircraft and Marine Products Company, Celina, Ohio, a corporation of Ohio Application June 12, 1952, Serial No. 293,171

10 Claims. (Cl. 248—27)

This invention relates to an instrument mounting, and more particularly to a clamp type mounting which is detachably secured to the rear of an instrument panel for releasably clamping an instrument thereto.

Instrument mountings of the type under consideration are known, and comprise a clamp of the split band type having a toggle mechanism for actuating the same. The clamp is adapted to be detachably secured, by two screws, to the rear of an instrument panel having a cut-out to expose an instrument therein. One of the screws, which detachably secures the clamp to the panel, also serves to actuate the toggle mechanism for firmly contracting the split band about the body or case of an instrument. This type of mounting has several advantages, among which may be mentioned position adjustability, i. e. an instrument so mounted may easily be rotated on the instrument panel, by slightly releasing the clamp, in order to achieve a proper alignment of the instrument with respect to the panel, ready detachability, i. e. an instrument may be removed and replaced in an extremely short time from the front of the instrument panel.

Band clamp instrument mountings of this type are subject to rather serious manufacturing difficulties, however. In particular, the parts are so dimensioned that the clamp contracting and mounting screw firmly holds the clamp tight against the rear of the instrument panel when the clamp is contracted tightly about the instrument case. Obviously, this two-fold function of the screw is dependent upon accurate dimensions of the toggle mechanism, as well as of the screw. The toggle mechanism comprises two pivot blocks spaced along the split, or the opposed edges, of the band, and these blocks are connected to the opposed band edges by two pairs of links, each pair connecting one block to the opposed band edges.

It readily will be seen that even very small deviations from exact dimensions, in the length of such links and in their points of pivotal connection to both the band and the pivot blocks, will defeat the two-fold function of the aforedescribed screw. In one particular instance, manufacturing tolerances must be confined to .005 inch in order to obtain the aforedescribed two-fold functions of the screw. Deviations from these tolerances in one direction produce an effect whereby when the screw is tightened sufficiently to actuate the toggle mechanism to cause the band clamp to firmly grip the body or case of the instrument, the screw head is not firmly engaged with the outer face of the instrument panel, or conversely the edge of the clamp is not pulled tight against the rear face of the panel. In this instance the band clamp, together with the instrument, is not firmly secured to the instrument panel, thus permitting excessive vibration of the instrument. Deviations from manufacturing tolerances in another direction, produce an effect whereby when the screw is tightened sufficiently to secure the band clamp firmly to the instrument panel, the clamp does not firmly grip the body or case of the instrument. In this instance, the instrument will not be secured firmly in place and not only can rotate into misalignment, but also actually may fall out of the instrument panel. Obviously, either of these situations is extremely undesirable and necessitates rigid control of manufacturing tolerances. Since these tolerances are extremely small, the percentage of rejects is correspondingly large with resulting high costs of manufacture.

It is, therefore, an object of this invention to provide an instrument mounting of the type under consideration with simple and inexpensive means for compensating for deviations from permissible manufacturing tolerances and for making dimensional variations which occur in the process of manufacture less critical.

It is another object of this invention to provide an instrument mounting band clamp of the type described with means for assuring that when the clamp is tightened firmly about an instrument body, the band clamp is secured firmly to an instrument panel.

It is another object of this invention to provide the toggle mechanism of band clamps of the type described with means for compensating for deviations from permissible manufacturing tolerances in the manufacture of such toggle mechanism.

It is another object of this invention to provide the toggle mechanism of band clamps of the type under consideration with means for assuring that when the band clamp is securely fastened to an instrument panel by the toggle mechanism actuating screw, the band clamp firmly grips an instrument body.

It is a further object of this invention to provide the toggle action of a band clamp of the type under consideration with means for reducing the tendency of the toggle mechanism actuating screw to loosen or "back up" under conditions of excessive vibration.

Other objects and advantages of this invention will be evident from the following description and accompanying drawings, in which:

Figure 1 is a plan view of an instrument mounting embodying this invention and illustrating the mounting fastened to an instrument panel and firmly gripping an instrument.

Figure 2 is a view corresponding to Figure 1 but taken at 90° thereto.

Figure 3 is a fragmentary view corresponding to Figure 1, but illustrating the instrument mounting in "loose" condition and before the same has been tightened about the instrument case.

Figure 4 is a fragmentary sectional view taken substantially upon the line 4—4 of Figure 1.

Figure 5 is a fragmentary view illustrating the toggle mechanism shown in Figure 1 and taken from the upper end of the mechanism shown in such figure.

Figure 6 is a fragmentary view corresponding to Figure 1, but illustrating a modification of this invention.

Figure 7 is a fragmentary sectional view taken substantially upon the line 7—7 of Figure 6.

Figure 8 is a fragmentary view corresponding to Figure 1 and illustrating another modification of this invention.

Figure 9 is a perspective view of a cambered leaf spring shown in Figure 8.

Referring now to the drawings, there is shown in Figures 1, 2, and 3 an instrument panel 10 provided with a circular cut-out 12 in which is disposed an instrument 14 having a cylindrical body or case 16 provided with a circumferential flange or escutcheon plate 18 at its forward edge for overlapping the edges of the panel cut-out. An instrument mounting in the form of a split band 20 adapted to embrace the cylindrical body 16 of the instrument 14 at the rear of the panel 10 has a radial lug 22 adjacent one end edge 24 of the band disposed diametrically opposite the spaced opposed edges 26 at the split in the band. The lug 22, which is soldered, welded, or otherwise suitably secured to the band 20, threadedly receives a headed fastening screw 28 which extends through a clearance aperture 30 in the instrument panel 10. Preferably, the lug 22 is provided with a transverse slot 32 which intersects the screw receiving recess therethrough in order to provide a screw-locking effect.

On the opposite side of the band 20 and intermediate its end edges 24 and 34, a pair of radial lugs 36 are secured to the band adjacent the opposed edges 26, as by welding, soldering, or other appropriate securing means. Pivotally connected to these lugs 36, by two pairs of links 38 and 40, are a pair of pivot blocks 42 and 44, spaced along the opposed edges 26 of the band 20. As best shown in Figure 5, the links 38 and 40 are pivotally connected to the radial lugs 36 by means of upset pivot pins 46 integrally formed with, or otherwise suitably connected to, the lugs. The pivot blocks 42 and 44 are substantially H-shaped, as viewed in Figure 5, having a slot 48 in each end thereof within which the other ends of the links 38 and 40 are pivotally secured, as by means of rivets 50 extending through the pivot blocks.

The pivot block 42, which is disposed adjacent the instrument panel 10, has a threaded aperture therethrough for the reception of a headed screw 52, such screw extending through a clearance aperture 54 in the instrument panel 10. At its end the screw 52 is provided with a reduced smooth axial extension 56 which forms a shoulder 58 on the screw and extends through a clearance aperture in the other pivot block 44. Interposed between the shoulder 58 on the screw 52 and the opposed face of the pivot block 44 is a coil compression spring 60 encircling the screw extension 56. Preferably, this spring 60 is retained on the pivot block 44 by a bushing-like member 62, having a circumferential flange 64 at one end thereof adapted to seat against the shoulder 58 on the screw 52 and a bore therethrough for receiving the screw extension 56. This bushing-like member 62 slidably extends through the clearance aperture in the block 44 and has its outer end turned over, as at 66, for fastening the member to the block. Preferably, when the parts are in the position shown in Figure 3, that is, before the clamp is tightened about the instrument body, the spring 60 engages both the flange 64 on the bushing-like member 62 and the opposed face of the pivot block 44. Obviously, rotation of the screw 52 in one direction serves to separate the blocks 42 and 44 and thereby pull the opposed edges 26 of the band 20 together to cause the latter to contract.

The spring 60 is strong enough not to yield appreciably until the pivot blocks 42 and 44 have been separated sufficiently, for the band 20 to contract into engagement with the instrument case 16. Thereafter, appreciable further separation of the blocks is impossible, except for a slight amount to tighten the grip of the band on the instrument case, but rotation of the screw 52 may be continued in a clamp-tightening direction because the spring 60 will yield. In this connection it will be noted that, as shown in Figures 1, 2, and 4, the bushing-like member 62 may slide in the clearance aperture in the block 44 in the direction of axial screw movement to permit compression of the spring 60. The axial length of the spring 60 is desirably related to the length of the screw 52, between its head 68 and its shoulder 58, so that when the band 20 is drawn tightly against the rear face of the instrument panel 10 by the action of the screw, the band tightly grips the instrument case 16 and the spring is about half way compressed.

Hence, if there are deviations from manufacturing tolerances in a direction to produce an effect whereby when the band 20 is completely tightened on the instrument body 16, the edge 24 of the clamp is not pulled into tight engagement with the rear face of the instrument panel 10, the screw 52 may be rotated further, because of the yieldability of the spring 60, to pull the edge 24 of the clamp tightly against the instrument panel. Should the deviations from manufacturing tolerances be in the opposite direction whereby when the edge 24 of the clamp is pulled tight against the instrumental panel 10, the band clamp 20 is not contracted tightly about the instrument case 16, the compression of the spring 60 separates the pivot blocks 42 and 44 with sufficient force to cause the band to tightly grip the instrument case. Thus, deviations from manufacturing tolerances are compensated for.

It also will be seen that the loading of the screw 52 by the spring 60 reduces any tendency of the screw to loosen under vibration.

Other types of springs are possible of use to achieve the results of this invention. As shown in Figures 6 and 7, the coil compression spring 60 previously described may be replaced by a compressible washer 70, of rubber or other material having comparable resilient characteristics. In this modification of the invention the resilient washer 70 is contained within a metallic protective jacket 72 and has a metal washer 74 interposed between the rubber washer and the shoulder 58 on the screw 52. This metal washer 74 prevents abrasion and friction between the shoulder 58 on the screw and the rubber washer 70, as well as serving as further protection for the rubber washer. Preferably, in order to retain the washer 70 in place on the pivot block 44 for reception of the screw extension 56, the washer jacket 72 is provided with a bushing-like extension or element 76 which extends through the clearance aperture in the pivot block 44 and has a turned-over outer end, as at 78, similar to the turned-over end 66 on the previously described bushing-like member 62.

In the modification of this invention illustrated in Figures 8 and 9, the coil compression spring 60 is replaced by a cambered leaf spring 80 provided with a clearance aperture 82 for the screw extension 56 and having its convex face opposed to the shoulder 58 on the screw 52. The opposite ends of the leaf spring engage with the block 44 and are provided with slots 84 to accommodate the links 40. Additionally, the opposite ends of the cambered leaf spring 80 are provided with finger-like extensions 86 which are turned over at an angle of substantially 90° with respect to the ends of the leaf spring and are engaged with the opposite ends of the pivot block 44 to prevent rotational movement of the spring 80, by its engagement with the shoulder 58 on the screw, in order to lessen any tendency of the spring to bind the links 40.

It thus will be seen that the objects of this invention have been fully and effectively accomplished. It will be realized, however, that the specific embodiments of this invention illustrated and described for disclosing the principles thereof are susceptible of change without departing from such principles. Therefore, this invention includes all modifications encompassed by the spirit and scope of the following claims.

I claim:

1. A mounting for securing an instrument to an instrument panel having a cut-out to expose the instrument comprising: a split band for embracing the instrument and adapted to be mounted on the rear of the panel; a toggle mechanism for contacting said band to grip the instrument, said mechanism including two opposed pivot blocks spaced longitudinally along the opposed edges of said band and two pairs of links, one pair for each block and connecting the corresponding block to said opposed band edges; a headed screw adapted to be received through a clearance hole in the panel from the front thereof and threaded through the adjacent one of said blocks; an abutment on said screw between said blocks; and compression resilient means interposed between said abutment and the other of said blocks.

2. The structure defined in claim 1 in which the resilient means is a compression coil spring.

3. The structure defined in claim 1 in which the resilient means is a cambered leaf spring.

4. The structure defined in claim 1 in which the resilient means is a metal-jacketed rubber washer.

5. The structure defined in claim 1 including a tapped lug on said band substantially opposite said toggle mechanism for receiving a headed screw through a second clearance hole in the panel.

6. A mounting for securing an instrument to an instrument panel having a cut-out to expose the instrument comprising: a split band for embracing the instrument and adapted to be mounted on the rear of the panel; a toggle mechanism for contracting said band to grip the instrument, said mechanism including two opposed pivot blocks spaced longitudinally along the opposed edges of said band and two pairs of links, one pair for each block and connecting corresponding block to said opposed band edges; a headed screw adapted to be received through a clearance hole in the panel from the front thereof and threaded through the adjacent one of said blocks, said screw having a reduced extension slidably received through a guiding hole in the other of said blocks and forming a shoulder on said screw between said blocks; a bushing slidably mounted on said screw extension for engagement with said shoulder and slidably extending through said other block hole, said bushing having exterior circumferential flanges at its opposite ends; and a coil compression spring encircling said bushing between said blocks and engaging said other block and one of said bushing flanges.

7. A mounting for securing an instrument to an instrument panel having a cut-out to expose the instrument comprising: a split band for embracing the instrument and adapted to be mounted on the rear of the panel; a toggle mechanism for contracting said band to grip the instrument, said mechanism including two opposed pivot blocks spaced longitudinally along the opposed edges of said band and two pairs of links, one for each block and connecting the corresponding block to said opposed band edges; a headed screw adapted to be received through a clearance hole in the panel from the front thereof and threaded through the adjacent one of said blocks, said screw having a reduced extension slidably received through a guiding hole in the other of said blocks and forming a shoulder on said screw between said blocks; and a cambered leaf spring overlying said other block with its convex side opposed to said screw shoulder and having a clearance hole therein of less diameter than said screw shoulder aligned with said other block hole and slidably receiving said screw extension.

8. The structure defined in claim 7 including turned-over fingers on the ends of the spring engaged with opposite end faces of the other block to prevent rotation of said spring about the axis of the screw.

9. A mounting for securing an instrument to an instrument panel having a cut-out to expose the instrument comprising: a split band for embracing the instrument and adapted to be mounted on the rear of the panel; a toggle mechanism for contracting said band to grip the instrument, said mechanism including two opposed pivot blocks spaced longitudinally along the opposed edges of said band and two pairs of links, one pair for each block and connecting the corresponding block to said opposed band edges; a headed screw adapted to be received through a clearance hole in the panel from the front thereof and threaded through the adjacent one of said blocks, said screw having a reduced extension slidably received through a guiding hole in the other of said blocks and forming a shoulder on said screw between said blocks; and a resilient washer mounted on said extension between said shoulder and said other block.

10. The structure defined in claim 9 including a cylindrical metallic jacket for the washer of greater interior diameter than the diameter of the shoulder on the screw, said jacket having a reduced tubular extension extending through the guiding hole and having an outer circumferential flange on the end thereof.

References Cited in the file of this patent

UNITED STATES PATENTS

| Number | Name | Date |
|---|---|---|
| 1,376,315 | Brizendine | Apr. 26, 1921 |
| 2,598,704 | Lai | June 3, 1952 |
| 2,603,102 | Hobbs | July 15, 1952 |
| 2,616,644 | Christophersen | Nov. 4, 1952 |